United States Patent Office 3,461,421
Patented Aug. 12, 1969

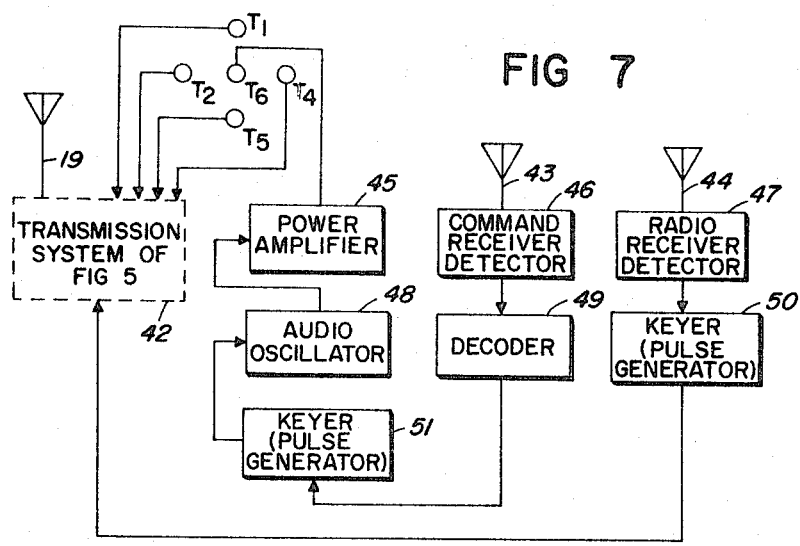
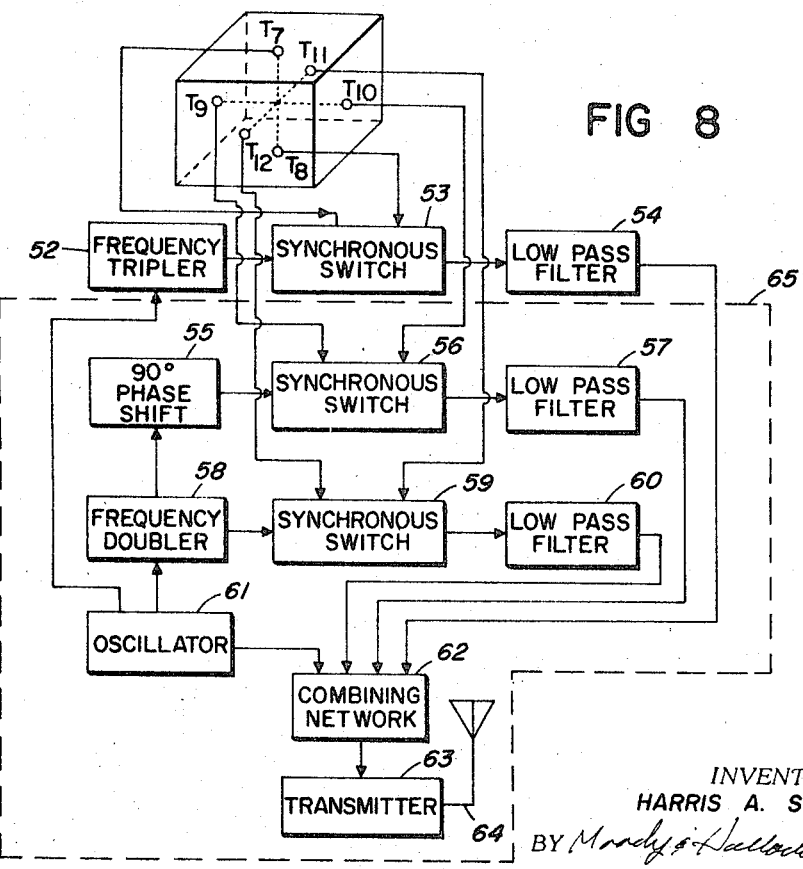

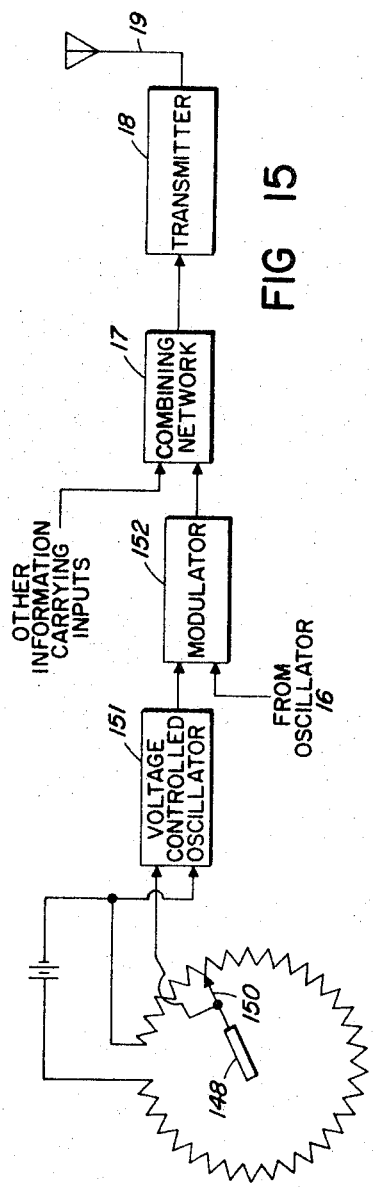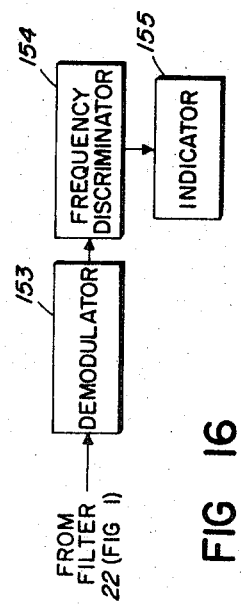

3,461,421
ADVANCED DIRECTION FINDING
SONOBUOY SYSTEM
Harris A. Stover, Cedar Rapids, Iowa, assignor to Collins
Radio Company, Cedar Rapids, Iowa, a corporation of
Iowa
Filed July 25, 1967, Ser. No. 655,875
Int. Cl. G01s 1/72, 3/14, 3/80
U.S. Cl. 340—2                                23 Claims

ABSTRACT OF THE DISCLOSURE

Disclosed is a very versatile sonobuoy system which is capable of indicating the direction and range of a source of sound located at an unknown position. The sonobuoy system employs four omnidirectional hydrophones located at the corners of an imaginary square. The outputs from diametrically spaced hydrophones are combined and the combined signal is used to modulate a reference subcarrier for transmission to a receiving system. The receiving system demodulates the various subcarriers and the demodulated signals are used to actuate the deflection system of a cathode ray tube or some other indicating means. The orientation of the sonobuoy with respect to true north is detected by means of magnetometers or some other detecting means. The orientation information is used to modulate a reference subcarrier for transmission to a receiving system. By receiving and detecting all the information transmitted by the transmitting system the location and range of a sound source with respect to the sonobuoy is obtained at a remote location equipped with a receiver capable of receiving and utilizing the transmitted information.

---

This invention relates generally to sonobuoys and particularly to a sonobuoy system which has direction finding and range capabilities.

The listening sonobuoy as it is presently used is an expendable listening device for submarine or ship detection. It is dropped on the surface of the water where it divides into two parts. A hydrophone is released from the main body portion and lowered on a cable some 40 to 50 feet or more below the surface of the water while a radio transmitter enclosed in the main body remains on the surface to transmit the sounds of unidentified craft picked up by the hydrophone to nearby aircraft or ships. In addition the radio can be employed as a beacon receiver to trigger a transmitter pulse when the searching aircraft or ship radar sweeps across the buoy. The transmitted pulse is received by the searching craft and thereby serves as an aid in locating the sonobuoy. Adequate provision is therefore made for locating the position of the sonobuoy. However, most hydrophones are omnidirectional and therefore provide very little useful information other than the presence of a submarine or ship within the listening range of the sonobuoy. In order to determine the range and exact location of the detected craft it is necessary to drop several sonobuoys, each operating on its own radio frequency, in a pattern and calculate the range of the submarine to each sonobuoy by the strength of the sound picked up by the sonobuoys. The radio receiver operator can then approximate the location and direction of travel of the detected craft based upon this information.

The complexity and inaccuracy of this system illustrates the need for a sonobuoy with direction and range capability. This need has been recognized in the past and some solutions have been offered. Sonobuoys with direction finding capability employing directional hydrophones which rotate in the water have been employed. In order to determine the direction relative to north a time comparison is made between the time when the directional hydrophone is pointed north and when the maximum intensity of the sound is received. Although this is an improvement over an omnidirectional sonobuoy, it still has a number of disadvantages. First, it is only practical to rotate the sonobuoy at moderate speeds. This is partly due to the fact that rapid rotation of the sonobuoy may cause noise in the hydrophone because of turbulence in the water. Also since the sound coming from the submarine is not necessarily constant in intensity, the loudest signal is not necessarily received when the directional hydrophone is pointed toward the sound source. Another disadvantage is the considerable power required to rotate the directional hydrophones over a long period of time. This requirement results in unduly cumbersome and expensive sonobuoys.

It is therefore an object of this invention to provide a direction finding sonobuoy system which requires no moving parts.

It is another object to provide such a sonobuoy which does not depend upon any time coincidence relative to a directional hydrophone to determine the direction of received sounds.

It is another object to provide such a sonobuoy which employs omnidirectional hydrophones and which provides an output of the total sound arriving from all directions the same as prior art omnidirectional hydrophones while at the same time indicating the direction of arrival of the sound.

After describing how the inventive system is used to indicate the direction of arrival of a sound from anywhere in a 360° horizontal plane, it will be shown how the system may be extended to provide the vertical angle of arrival in addition to that in the horizontal plane. The vertical angle will be of much less value than the horizontal due to the bending of the sound propagation path resulting from temperature, pressure, and salinity gradients (temperature layer effects in particular). It is therefore another object to provide a directional sonobuoy which provides the direction of arrival of a sound in both the horizontal and vertical planes relative to the position of the sonobuoy.

The systems described herein may effectively employ many of the techniques that are employed by sonobuoys in the prior art; i.e., dropping from aircraft or ships, maintaining radio contact to recover the information, radio beacon replies to radar systems, dye markers, etc. for locating the sonobuoys. Also dissolving plugs which permit the sonobuoys to fill with water and sink after a predetermined length of time can be used. All of these techniques have been applied in the past and may be applied to the system described herein and no further discussion is necessary.

Another deficiency of the prior art sonobuoys is their inability to determine the range from the detected craft. Consequently, some discussion will be provided hereinafter relative to the extension of the inventive systems to provide each sonobuoy with ranging capability. It is therefore another object of this invention to provide a directional sonobuoy which provides range, as well as directional, information relating to a detected craft.

Further objects, features, and advantages of the invention will become apparent from the following description and claims when read in view of the accompanying drawings wherein like numbers indicate like parts and in which:

FIGURE 7 shows a transmitting system utilizing four receiving hydrophones and one transmitting transducer and which is capable of transmitting a very accurate ranging function;

FIGURE 8 shows a transmitting system capable of receiving and transmitting direction information in a three dimensional spacial system;

FIGURE 15 shows another system for receiving and transmitting orientation information;

FIGURE 16 shows the modifications required of any of the various receiving system embodiments in order that they can receive the orientation information transmitted by the orientation system shown in FIGURE 15;

Figure 4:
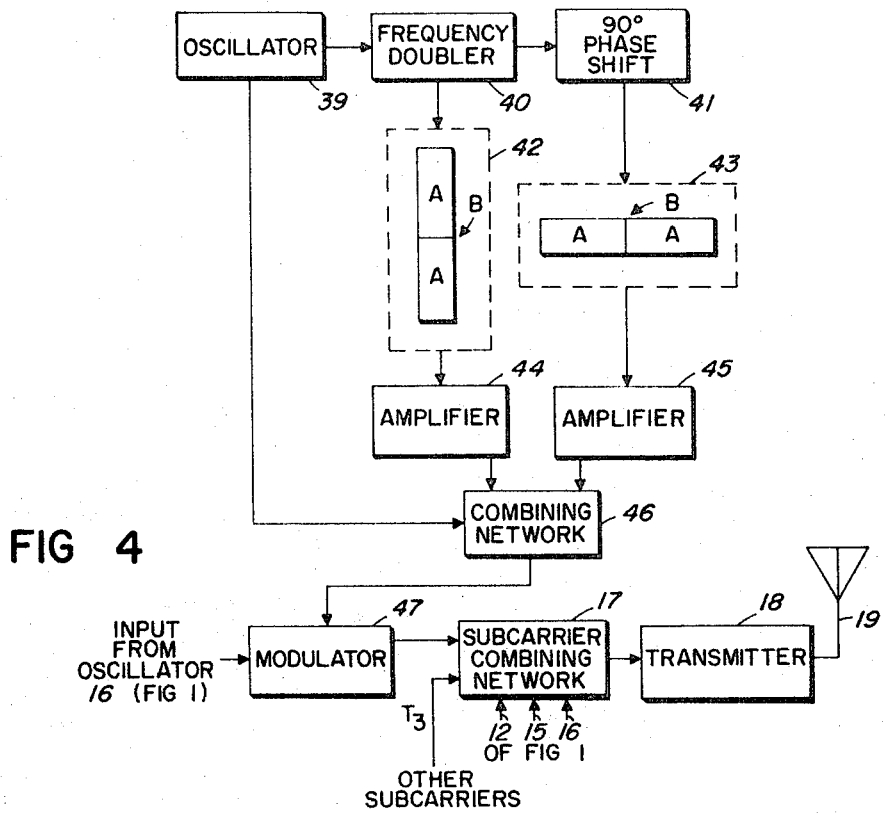
FIGURE 4 shows a system for transmitting information relative to the orientation of the sonobuoy system which utilizes two magnetometers.
Figure 9:
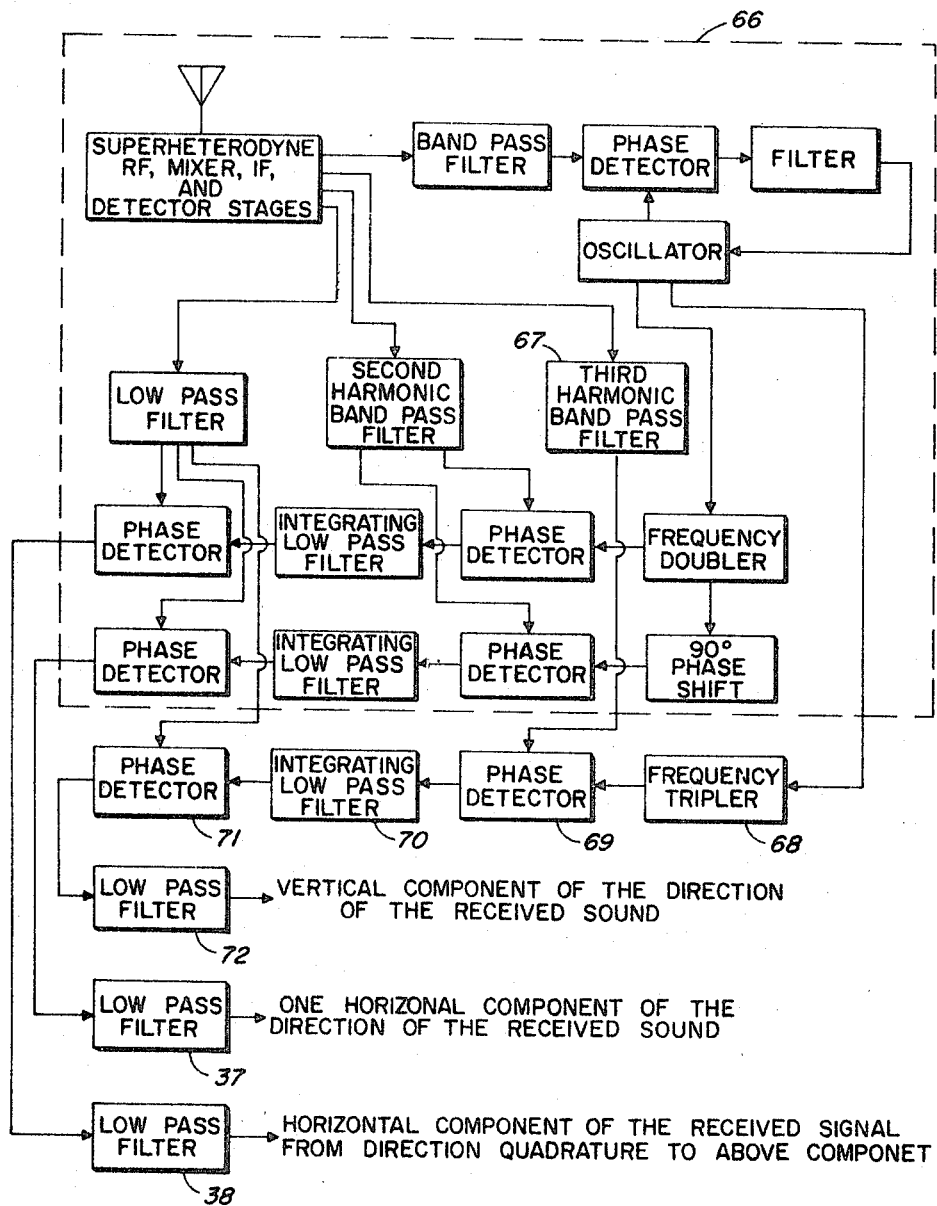
FIGURE 9 shows a receiving system capable of receiving and indicating the information transmitted by the transmitting system of FIGURE 8.
Figure 13:
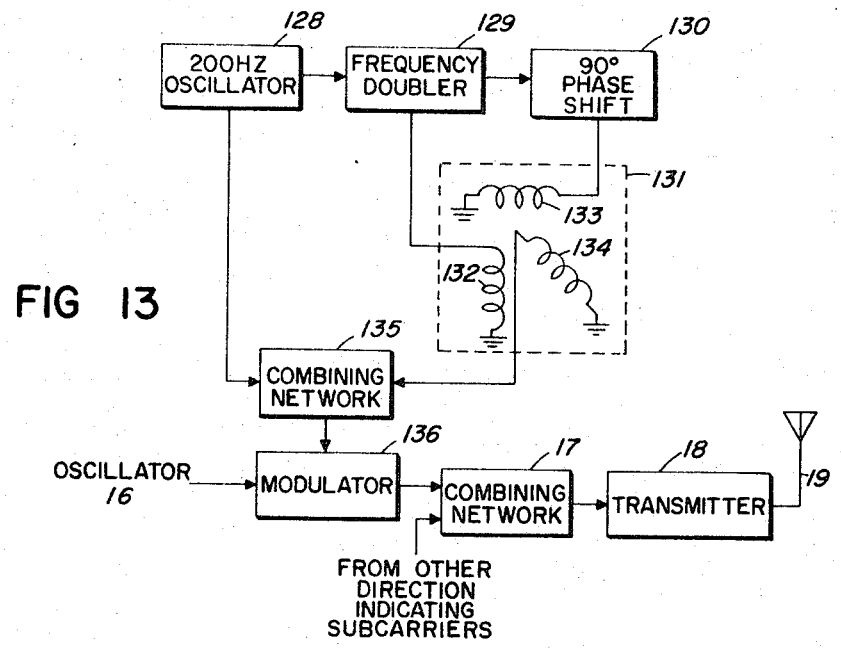
FIGURE 13 shows the modifications possible to any of the transmitting system embodiments in order to receive and transmit orientation information.
Figure 17:
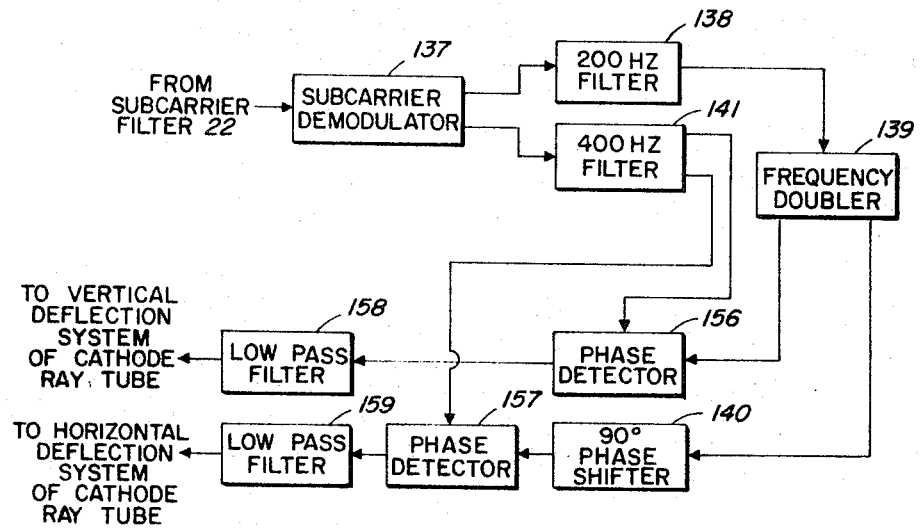
Figure 18:
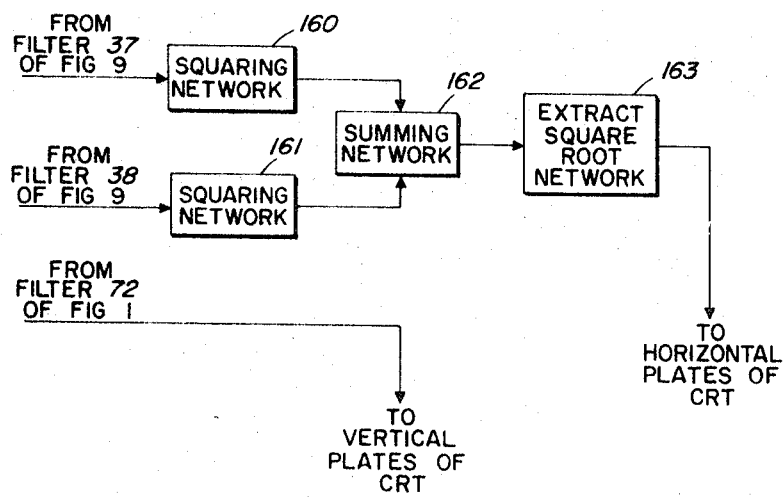

FIGURE 17 shows another system for receiving the orientation information transmitted by the systems of FIGURES 4 and 13; and FIGURE 18 shows a system for displaying the magnitude of the horizontal component obtained from the system of FIGURES 8 and 9 which in combination with the vertical component obtained from the systems of FIGURES 8 and 9 displays the vertical angle of arrival.

Figure 1:
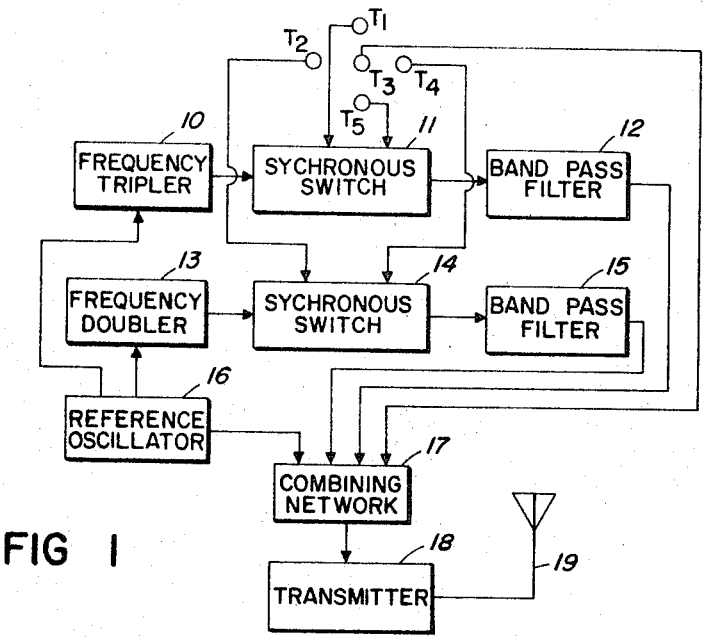
FIGURE 1 shows a first embodiment of a transmitting system using five hydrophones.

An understanding of the invention can be obtained by making reference to FIGURE 1. In FIGURE 1 $T_1$, $T_2$, $T_3$, $T_4$ and $T_5$ are receiving transducers (hydrophones) spaced considerably less than a wavelength apart. The wavelength spacing is determined by the highest frequency of the sound which the system will detect—for purposes of discussion a frequency of 4 kilohertz is chosen. As is well known in the art, a hydrophone is an instrument which converts sound waves present in water into electrical energy. However, any type of sound transducer can be used in the system and it need not be used in water to remain within the scope of the invention.

The hydrophones $T_1$, $T_2$, $T_4$ and $T_5$ are arranged in a horizontal plane at the four corners of a square. Hydrophone $T_3$ is located at the intersection of the diagonals of the square. The system consists of a Frequency Tripler 10, Synchronous Switch 11, and Bandpass Filter 12 connected in cascade. A Frequency Doubler 13, Synchronous Switch 14, and Bandpass Filter 15 are also connected in cascade. A 10 kc. Oscillator 16 feeds Frequency Tripler 10, Frequency Doubler 13 and Combining Network 17. A 10 kHz. frequency is chosen as exemplary only, as any desired frequency can be used. Combining Network 17 also receives the outputs of Bandpass Filters 12 and 15. Hydrophones $T_2$ and $T_4$ are connected to Synchronous Switch 14 and Hydrophones $T_1$ and $T_5$ are connected to Synchronous Switch 11. The output of Hydrophone $T_3$ is fed directly to Combining Network 17. The four inputs to Combining Network 17 are combined therein and transmitted via Transmitter 18 and Antenna 19 as will be more fully explained hereinafter. The output of Oscillator 16 is selected to be higher in frequency than the highest portion of the sound which is of interest. The Frequency Doubler 13 is used to produce the second harmonic of the oscillator output so that a signal with a definite phase relationship to the oscillator output will be produced. Likewise the Frequency Tripler 10 is used to produce the third harmonic with a definite phase relationship to that of the oscillator output. The reasons for this will become apparent later in the explanation. The hydrophones $T_1$, $T_2$, $T_3$, $T_4$ and $T_5$ are constructed to produce a response only in the low frequency portion of the audio spectrum which is to be detected. Such hydrophones are available in art and need not be structurally described herein. Hydrophones with a broader response can be used but their outputs must be passed through a low pass filter before being supplied to Synchronous Switches 11 and 14. For purposes of the present explanation it is also assumed that Hydrophones $T_1$, $T_2$, $T_3$, $T_4$ and $T_5$ have an omnidirectional response. However, it will be shown hereinafter that this characteristic is not essential to the system.

Because the spacing of the hydrophones is a portion of a wavelength of the highest audio frequency of interest, and because the higher frequencies are eliminated by the response of the hydrophones, or by low pass filters, no single sine wave component of a sound wave can undergo more than ½ cycle, or one complete reversal, in the time it takes for the wave to travel between any two hydrophones. The difference between the signal arriving at any two hydrophones will be maximum if a straight line between the two hydrophones is parallel to the direction of sound propagation, and will be zero if the line between two hydrophones is perpendicular to the direction of propagation. Consequently if a wave is coming from the direction of the top of the page of FIGURE 1, the difference between the signal $T_1$ and the signal at $T_5$, i.e. $(T_1-T_5)$ will have just the opposite relationship to the signal at $T_3$ from that produced by a wave coming from the direction of the bottom of the page, i.e., $(T_5-T_1)$. Thus the system provides the information necessary to determine the direction of arrival of the sound. Before discussing the more general situation of sound arriving at an angle to the line of the hydrophones the transmission of the signal to the receiving craft and the reception of the signal by the craft as well as methods of displaying the results will be given.

The Synchronous Switch 11 is a device which switches alternately between Hydrophones $T_1$ and $T_5$ and can be any one of many types available in the art. On the positive half cycle of the output of Frequency Tripler 10 Synchronous Switch 11 will switch the output of one hydrophone to the Bandpass Filter 12 and on the negative half cycle of the output of Frequency Tripler 10 it will switch the output of the other hydrophone to Bandpass Filter 12. If there is no difference between the outputs of Hydrophones $T_1$ and $T_5$ switching between them will not cause any alternating current component to appear at the switching frequency. This is the situation when the sound arrives at right angles to the line of $T_1$ and $T_5$. However, if the output of $T_1$ is greater than the output of $T_5$ an alternating current at the switching frequency is produced. The phase of the output is dependent upon which of the hydrophones first received the sound. Consequently if $T_5$ is greater than $T_1$ the phase of the alternating current will be reversed. Thus there is present at the output of Bandpass Filter 12 an alternating current with a magnitude proportional to the time delay between Hydrophones $T_1$ and $T_5$ and with a phase which depends upon whether the sound arrived at $T_1$ before $T_5$ or at $T_5$ before $T_1$. The phase reference is the output of Hydrophone $T_3$. The same discussion is applicable to the output of Frequency Doubler 13, Synchronous Switch 14, Hydrophones $T_2$ and $T_4$ and Bandpass Filter 15. However, the maximum magnitude of the signal is for a sound coming from the right or left instead of from top or bottom of the page.

Figure 5:
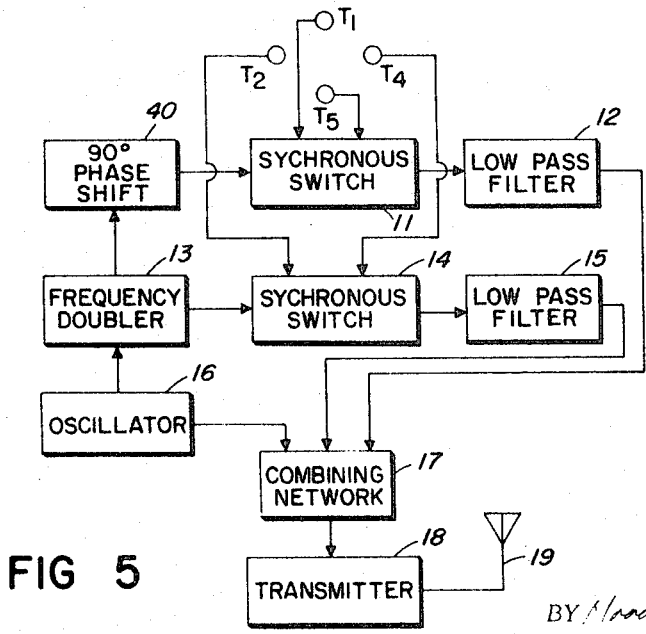
FIGURE 5 shows a transmitting system which utilizes only four receiving hydrophones.

The output from Hydrophone $T_3$ is combined with the outputs of Bandpass Filter 12, Bandpass Filter 15, and Oscillator 16 in the Combining Network 17 prior to modulating Transmitter 18 and transmitting the signal over Antenna 19. The transmitted signal therefore consists of the output of reference Hydrophone $T_3$ at baseband, a reference subcarrier from Oscillator 16, the second harmonic of the reference subcarrier from Frequency Doubler 13 modulated by the difference between the outputs of Hydrophones $T_2$ and $T_4$, and the third harmonic of the reference subcarrier from Frequency Tripler 10 modulated by the difference between Hydrophones $T_1$ and $T_5$. In the embodiment of FIGURE 5 it is shown how Hydrophone $T_3$ and one of the subcarriers may be eliminated.

Figure 2:
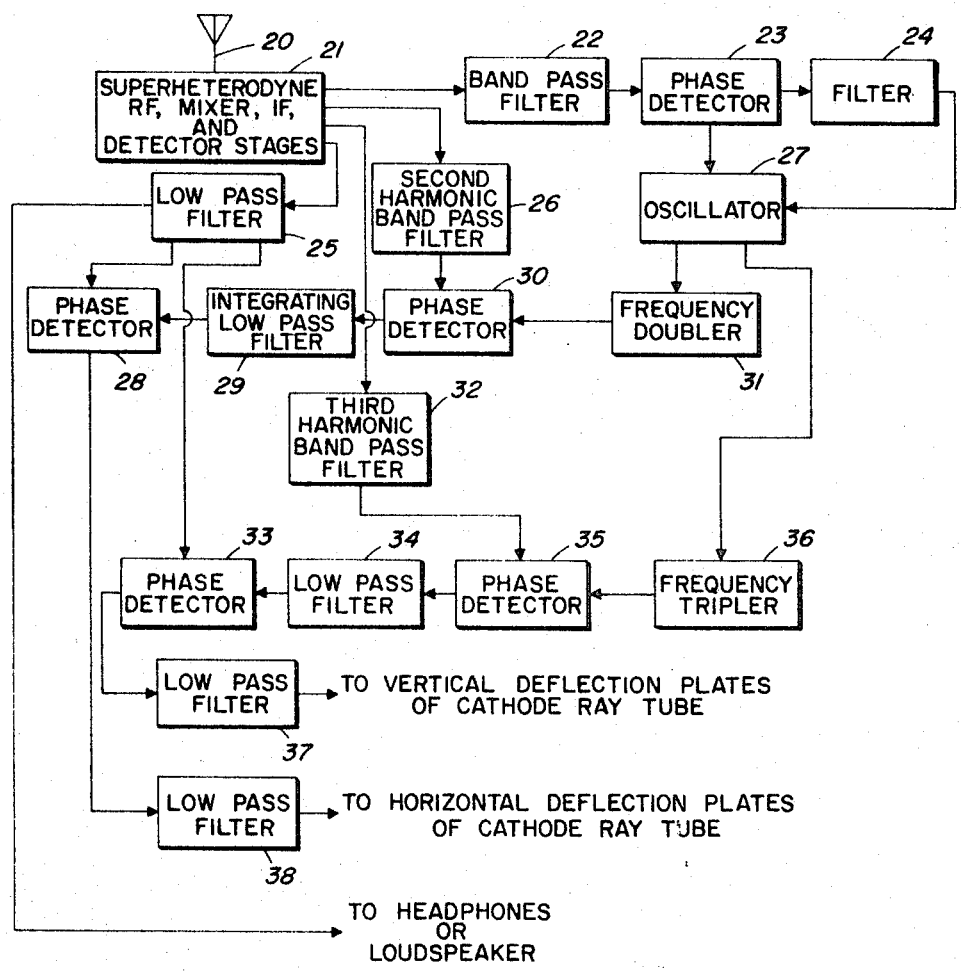
FIGURE 2 shows a receiving system capable of receiving and indicating the information transmitted by the system of FIGURE 1.

The receiving system to be employed with the above transmitting system is shown in FIGURE 2. The receiving system consists of a Receiving Antenna 20 and a Superheterodyne Receiver 21. Receiver 21 includes the detector stages, mixer, and R.F. and I.F. stages found in all such receivers. The output of Receiver 21 is fed to cascaded Subcarrier Bandpass Filter 22, Phase Detector 23, and Filter 24. The Receiver 21 output is also fed directly to Second Harmonic Bandpass Filter 26, Third Harmonic Bandpass Filter 32, and Low Pass Filter 25. A Phase Detector 30 receives inputs from Second Harmonic Bandpass Filter 26 and Frequency Doubler 31. The output of detector 30 goes to Integrating Low Pass Filter 29 which feeds Phase Detector 28. Detector 28 also receives an input from Low Pass Filter 25. Another Phase Detector 35 receives inputs from Third Harmonic Bandpass Filter 32 and Frequency Tripler 36. Phase Detector 35 then feeds Phase Detector 33 through Integrating Low Pass Filter 34. Detector 33 also receives an input from Low Pass Filter 25. Phase Detectors 28 and 33 respectively supply inputs to Low Pass Filters 38 and 37, the outputs of which can be connected to the deflection systems of a cathode ray tube (not shown). Filter 24 supplies an input to Oscillator 27 which provides an input to each of Frequency Doubler 31 and Frequency Tripler 36. In operation the signal from the directional sonobuoy is picked up by Antenna 20 and undergoes the normal frequency translation and detection in the Superheterodyne Receiver 21 of the receiving system. A Subcarrier Bandpass Filter 22 isolates the reference subcarrier from the rest of the detected signal. Phase detector 23, Filter 24, and Oscillator 27 comprise a phase locked loop which locks Oscillator 27 to the reference subcarrier frequency to provide a nearly noise free reference subcarrier frequency. In some Receivers 21 the signal to noise ratio at the output is sufficient and the phase locked loop comprised of Phase Detector 23, Filter 24, and Oscillator 27 can be omitted and the output of Bandpass Filter 22 fed directly to Frequency Doubler 31 and Frequency Tripler 36. The output of Frequency Doubler 31 is synchronized by the reference subcarrier to be in phase with the output of Frequency Doubler 13 in the transmission system shown in FIGURE 1. Thus the output of Phase Detector 30 will be proportional, including positive or negative sense, to the difference in the outputs of Hydrophones $T_2$ and $T_4$, i.e. $(T_2-T_4)$. In a similar manner the output of Frequency Tripler 36 is referenced to the reference subcarrier to be in phase with the output of Frequency Tripler 10 in the transmission system shown in FIGURE 1. When the Frequency Tripler 36 output is fed to Phase Detector 35 along with the output of Third Harmonic Bandpass Filter 32, the output of the Phase Detector will be proportional, including positive and negative sense, to the difference in output between Hydrophones $T_1$ and $T_5$, i.e. $(T_1-T_5)$. The two difference signals appearing at the outputs of Phase Detectors 30 and 35 will have frequency components the same as those received by the reference Hydrophone $T_3$. The output of Low Pass Filter 25 contains the same frequency components as Hydrophone $T_3$. Consequently when the outputs of Integrating Low Pass Filter 29 and Filter 25 are compared in Phase Detector 28 and the outputs of Filter 25 and Integrating Low Pass Filter 34 are compared in Phase Detector 33 the relative magnitude and bidirectional sense (positive or negative) of two perpendicular components of the direction of arrival of the sound are determined, each being represented by an output from Detectors 28 and 33. These Detector Outputs may be applied to the vertical and horizontal deflection plates of a cathode ray tube (or other indicator) and when a sound is received the spot on the cathode ray tube will jump away from the center of the screen indicating the direction of arrival of the sound at the transducers. The distance which the spot moves away from its rest position will be proportional to the intensity of the sound except that higher frequency components would cause greater deflections than lower frequency components if a compensating network was not provided to equalize the effects of frequency. The compensation is provided by integrating networks incorporated into Low Pass Filters 29 and 34. The Low Pass Filters 29 and 34 can therefore be operational amplifiers in tandem with low pass filters. Alternatively they can be RC integrating networks in tandem with the low pass filtering networks. The individual elements of both the transmitting system and receiving system are well-known in the art and need not be shown in more detail.

The preceding discussion is directed to the unique instance when the direction of propagation of the sound is along a line connecting the two hydrophones lying on the opposite ends of a diagonal. In the more general case the line of propagation of the sound will be at some angle $\theta$ to the hydrophones. The general situation is explained by reference to FIGURE 3. The explanation is simplified by using only three hydrophones, which can be viewed as either $T_1$, $T_3$ and $T_5$ or $T_2$, $T_3$ and $T_4$ of FIGURE 1.

Figure 3:
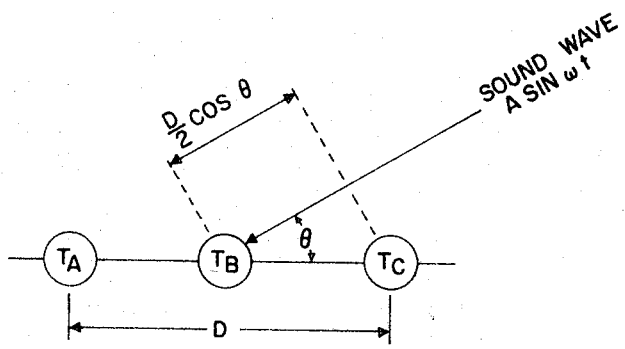
FIGURE 3 shows a generalized view of three hydrophones and is useful in explaining the operation of the various embodiments of the transmitting system.

In FIGURE 3 the distance between the outside hydrophones is represented as D. The distance $D/2 \cos \theta$ represents the additional distance the wave must travel in reaching $T_B$ after it has reached $T_C$, or the additional distance that it must travel after reaching $T_B$ before reaching $T_A$. The velocity of propagation of the sound is represented as V. The signal arriving at the three hydrophones $T_A$, $T_B$ and $T_C$ may then be presented as:

$$T_A = A \sin w\left(t - \frac{D \cos \theta}{2V}\right) \quad (1)$$

$$T_B = A \sin wt \quad (2)$$

$$T_C = A \sin w\left(t + \frac{D \cos \theta}{2V}\right) \quad (3)$$

where $w$ is the frequency of the sound wave in radians per second.

The difference between the signals at Hydrophones $T_A$ and $T_C$ is written:

$$T_A - T_C = A \sin w\left(t - \frac{D \cos \theta}{2V}\right) - A \sin w\left(t + \frac{D \cos \theta}{2V}\right) \quad (4)$$

Now if the integral of $T_A - T_C$ is fed to one input of a phase detector (a product device) and $T_B$ is fed to the reference input of the phase detector, the output of the phase detector will be given by:

$$[A \sin wt]\left[-\frac{A}{w} \cos w\left(t - \frac{D \cos \theta}{2V}\right) + \frac{A}{w} \cos w\left(t + \frac{D \cos \theta}{2V}\right)\right]$$

$$= [A \sin wt]\left[-\frac{2A}{w} \sin \frac{wD \cos \theta}{2V} \sin wt\right] =$$

$$-\frac{A^2}{w} \sin \frac{wD \cos \theta}{2V} + \frac{A^2}{w} \sin \frac{wD \cos \theta}{2V} \cos 2wt \quad (5)$$

neglecting the second harmonic term as it can easily be filtered off only the $$-\frac{A^2}{w} \sin \frac{wD \cos \theta}{2V}$$

terms remain.

Now assuming that distance D is considerably less than a wavelength, i.e., $$D < \frac{\lambda}{4}$$

the term $wD/2V$ will be small permitting use of the approximation $\sin x = x$, and expression (5) will be approximately $$-\frac{A^2 D}{2V} \cos \theta$$

The assumption is valid because the hydrophones can be placed anywhere chosen. If $T_C$ and $T_A$ in FIGURE 3 had been respectively above and below $T_B$ the output would have been $$-\frac{A^2 D}{2V} \sin \theta$$

Therefore by comparing these locations of the hydrophones with those given for the transmission system of FIGURE 1 and the phase detector with Phase Detectors 28 and 33 in the receiving system of FIGURE 2 it is evident that the outputs of Phase Detectors 28 and 33 may be written as $M \sin \theta$ and $M \cos \theta$. When these are applied to the vertical and horizontal deflection systems of a cathode ray tube they will produce a deflection proportional to the magnitude M and in the direction given by the angle $\theta$. The magnitude M is then an indication of the range of the sound and the angle $\theta$ is quite an accurate indication of the direction. Since $$M = -\frac{A^2 D}{V}$$

the earlier statement that the amount of deflection of the cathode ray tube spot will be independent of the frequency of the received signal is explained. If Filters 29 and 34 do not include integrating functions the expression for M contains a frequency term ($w$). However, since the deflection is directly proportional to frequency in such instances it is a simple matter to add a low pass filter giving an attenuation of 6 db per octave which has a very low corner frequency and compensate for this effect and achieve the same range result. The sonobuoy system comprising the transmitter of FIGURE 1 and receiver of FIGURE 2 is now seen to yield the direction of a received sound relative to the positions of the hydrophones on the sonobuoy and also an indication of the range of the signal from the sonobuoy.

The ability to determine the direction of a sound relative to the orientation of the hydrophones on the sonobuoy must be augmented by the knowledge of a reference orientation for the sonobuoy. One possible method of providing this, since the sonobuoy is a free floating body, is to install large bar magnets in both the transmitter and hydrophone sections of the sonobuoy so that the earth magnetic field will cause them to align themselves toward the magnetic poles. The four hydrophones can be located at four known locations on the sonobuoy, e.g., north, south, east and west. If this is done, the cabling between the two sections of the sonobuoy should be of a woven rather than a twisted form so that no torque between the two bodies will result from the cable. If this system is used, after the sonobuoy is dropped into the water it will align itself with magnetic north and the reading obtained in the receiving craft will be relative to magnetic north.

Another approach which is somewhat more complex than simply allowing the sonobuoy to rotate itself to magnetic north is the installation of orthogonal magnetometers in the sonobuoy and the addition of sub-subcarriers to transmit the magnetometer information. The additional sub-subcarriers then indicate the present rotational position of the sonobuoy and permit allowance for its position at the indicator. The sub-subcarrier presents no problem and does not require an additional structure in the sonobuoy. Referring again to FIGURE 1, Oscillator 16 generates a reference subcarrier. This subcarrier is transmitted without any modulating information thereon. The subcarrier output of Oscillator 16 can therefore be amplitude or phase modulated with the position information of the sonobuoy. Because the subcarrier is present in the system as it was initially described the additional information can be transmitted without increasing the bandpass spectrum of the transmitted signal.

FIGURE 4 shows modifications in the transmitting system of FIGURE 1 permitting it to obtain and transmit orientation information by the use of Hall effect magnetometers. Other types of magnetometers can also be used, such as flux gate magnetometers. A Hall effect generator is a device in which a current flowing in a magnetic field produces an electromotive force at right angles to both the current and the field. The electromotive force is proportional to the product of the magnetic density and the current and the sine of the angle between them. In FIGURE 4 magnetometers 42 and 43 are orientated at right angles to one another in a horizontal plane. The letters A and B respectively represent high permeability magnetic material and a Hall effect generator.

The modifications to the transmitting system consist of a 200 Hz. Oscillator 39 (the frequency is exemplary only), the output of which is fed to Frequency Doubler 40 and Combining Network 46. The output of Magnetometers 42 and 43 are respectively amplified by Amplifiers 44 and 45 and fed to Combining Network 46. The output of Combining Network 46 serves as an input to Modulator 47 and thereby modulates the reference carrier from Oscillator 16 of FIGURE 1. The Modulator 47 output goes to Combining Network 17, Transmitter 18, and Antenna 19, which are the same circuits shown in FIGURE 1 having like reference numbers. The elements identified by reference numbers 39 to 47 are additions to the transmitting systems shown in FIGURE 1, the transmitting systems are otherwise identical.

Magnetometers 42 and 43 respectively receive the outputs of Frequency Doubler 40 and 90° Phase Shift 41. The Magnetometers therefore generate voltages which are perpendicular to the plane of the page, with the voltage going into the page, as the result of the earth's magnetic field. The voltages produced are amplified by Amplifiers 44 and 45. The driving currents are 90° out of phase and resulting voltages are 90° out of phase because the voltage produced by each magnetometer is the product of the current and the magnetic field and the sine of the angle between the current and the magnetic field. The resulting 400 Hz. output of combining network 46 will undergo a complete 360° phase shift as the direction of the magnetic field moves through 360° in the plane of the page because magnetometers 42 and 43 are perpendicularly orientated and the voltage outputs are also 90° part in phase. The 400 Hz. signal applied to the Modulator 47 will therefore be a phase varying signal with reference to the 200 Hz. reference and thus is indicative of the orientation of the sonobuoy as its position varies with respect to the earth's magnetic field. Therefore the orientation of the sonobuoy relative to the earth's magnetic field is easily determined without the use of any moving parts in the sonobuoy by using the transmitting system of FIGURE 4 and the receiving system to be described later relative to FIGURES 14 and 17. Other means for transmitting and receiving orientation information will be described later with reference to FIGURES 13, 14, 15, 16 and 17.

The transmission system shown in FIGURE 1 uses five hydrophones. This is an acceptable and operable system. However, the structure of the system can be simplified by removing several elements and still achieve the desired operation. A transmitting system using only four hydrophones is shown in FIGURE 5. This system differs from that of FIGURE 1 by the elimination of Hydrophone $T_3$. Also the Frenquency Tripler 10 of FIGURE 1 is replaced by a 90° Phase Shift Network 40. The other elements of the two embodiments are the same as indicated by the use of like reference numerals. The removal of Hydrophone $T_3$ is permissible because the sum of the signals from the four Hydrophones $T_1$, $T_2$, $T_4$ and $T_5$ will be nearly the same as the signal at Hydrophone $T_3$. This can be mathematically established by referring again to FIGURE 3, and the mathematical discussion thereof hereinbefore, and proceeding through the same mathematical discussion. After replacing $T_B$ with $T_A+T_C$ we have from Equations 1 and 3:

$$T_A+T_C = A \sin w\left(t - \frac{D \cos \theta}{2V}\right) +$$
$$A \sin w\left(t + \frac{D \cos \theta}{2V}\right) = 2A \sin wt \cos \frac{wD \cos \theta}{2V}$$
(6)

The output of the phase detector will then be given by:

$(T_A+T_C)\int(T_A-T_C)dt =$
$\left[2A \cos \frac{wD \cos \theta}{2V} \sin wt\right]\left[-\frac{2A}{w} \sin \frac{wD \cos \theta}{2V} \sin wt\right] =$
$\left[-\frac{A^2}{w} \sin \frac{wD \cos \theta}{V}\right][1-\cos 2wt]$
(7)

The second harmonic term is again removed by filtering so that the expression becomes:

$$-\frac{A^2}{w} \sin \frac{wD \cos \theta}{V}$$

This expression differs from that for the five hydrophone system only by a factor of two in the argument of the sine function. The factor of two in the argument of the sine function is material because it affects the spacing (D of FIGURE 3) between the hydrophones. When using the two outer hydrophones in the horizontal and vertical directions the distance D must be only half as great as when using three hydrophones. If $wD/V$ is small so that the approximation $\sin x = x$ can be made the above expression becomes $$-\frac{A^2 D}{V} \cos \theta$$

The foregoing discussion is directed to the system as shown in FIGURE 3 and therefore is applicable to the hydrophones located in the horizontal plane. It therefore yields the right-left component of the total signal the same as by use of hydrophone $T_3$ if it were used. The same discussion is valid for the up-down direction simply by replacing all $\cos \theta$ terms in the expressions with $\sin \theta$ terms. The final expression for the vertical component would then become:

$$-\frac{A^2}{w} \sin \frac{wD \sin \theta}{V}$$

and after using the $\sin x = x$ approximation when $wD/V$ is small this becomes $$-\frac{A^2 D}{V} \sin \theta$$

It should be pointed out that the horizontal and vertical components as used here refer to the orientations shown in the figures. In the actual system all hydrophones are in the horizontal plane so that north-south and east-west components, for example, would be obtained.

The expressions for the horizontal and vertical signals each would contain a frequency ($w$) term if the signals were not integrated in filters 29 and 34 in the receiving system. As discussed hereinabove, this term is eliminated by the use of the integrating filters. Alternatively separate filters can be used in the receiving system. The range or sound intensity indication is independent of the frequency by using either method.

Referring again to FIGURE 5, it is seen that the removal of the Frequency Tripler from the system leaves only one subcarrier frequency. The two signals from the $T_1-T_5$ channel and the $T_2-T_4$ channel therefore appear as quadrature modulations on the subcarrier frequency. They are quadrature modulations because of the 90° Phase Shift Network 40. The transmission system of FIGURE 5 therefore requires only four hydrophones and only one subcarrier frequency in addition to the reference subcarrier frequency from Oscillator 16. The signal applied to Transmitter 18 therefore comprises a reference audio signal at baseband, the combined hydrophone outputs; a reference subcarrier from Oscillator 16 and two channels of difference information at twice the reference frequency from Frequency Doubler 13 and 90° Phase Shift Network 40.

Figure 6:
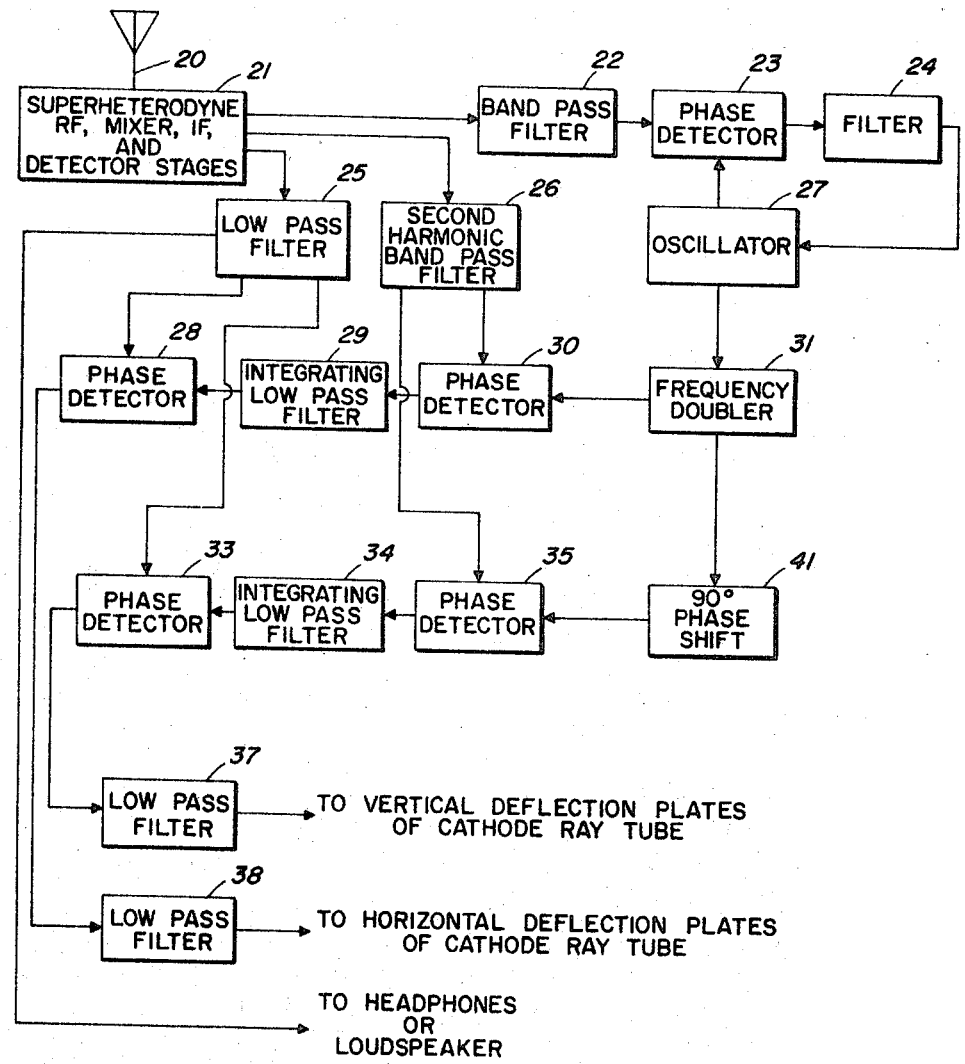
FIGURE 6 shows a receiving system capable of receiving and indicating the information transmitted by the transmitting system of FIGURE 5.

The receiving system useful with the transmitting system of FIGURE 5 is shown in FIGURE 6. The receiving system of FIGURE 6 differs from that of FIGURE 2 by the removal of Third Harmonic Bandpass Filter 32 and Frequency Tripler 36 and by the addition of 90° Phase Shift Network 41. All other components of the two systems are identical as indicated by like reference numerals. The FIGURE 6 system contains a phase locked loop to lock Oscillator 27 to the reference frequency. This loop can be eliminated from receivers having acceptable signal to noise ratios as explained in reference to FIGURE 2. The output of oscillator 27 is fed via Frequency Doubler 31 to Phase Detector 30 and 90° Phase Shift 41. The quadrature relationship established in the transmitting system is therefore reproduced in the receiving system by the use of 90° Phase Shift Network 41.

Some discussion of how the two information channels are carried on the same subcarrier will be helpful at this point. First, note that the sound is quite a low frequency when compared with the information subcarrier frequency (which is twice the reference subcarrier frequency) and therefore the difference between two hydrophone outputs will be relatively low in frequency. Therefore the difference information can be considered to be the amplitude of the subcarrier and for visualization of the operation of the system it can be visualized to be fixed in amplitude. In FIGURE 5 the subcarrier output (amplitude difference component; there is also a sum component at baseband which can be disregarded in this discussion) may be represented by Equation 8 for the output of Synchronous Switch 14.

$$E \sin 2w_r t \qquad (8)$$

and the subcarrier output of Synchronous Switch 11 is shifted by 90° so that it may be represented by Equation 9. In both cases $w_r$ represents the angular frequency of the reference subcarrier in radians per sec.:

$$F \cos 2w_r t \qquad (9)$$

The actual information transmitted on the subcarrier is the sum of these two and may be represented by Equation 10

$$E \sin 2w_r t + F \cos 2w_r t \qquad (10)$$

The amplitude and phase values of the combined wave are not considered here because it is easier to show the operation of the receiver if they are kept in this quadrature component form. Recalling that at the receiver the reference subcarrier is doubled in frequency to produce a demodulation reference which may be designated as $\sin 2w_r t$. Then the output of Phase Detector 30 of FIGURE 6 may be represented as Equation 11 where the sum (or $4w_r$) frequency terms have been neglected since they are removed by Low Pass Filter 29.

$$\sin 2w_r t \; (E \sin 2w_r t + F \cos 2w_r t) = E/2 \qquad (11)$$

The difference term of the product $(\sin 2w_r t)(\cos 2w_r t)$ is zero and the factor of ½ is easily allowed for in the equipment which follows the detector and causes no problem. In a similar manner the output of Phase Detector 35 may be represented by Equation 12.

$$\cos 2w_r t \ (E \sin 2w_r t + F \cos 2w_r t) = F/2 \quad (12)$$

Hence the two independent signal components are recovered at the receiver and continue to carry a sign as well as a magnitude. In the system just described these are the components of difference in sound received on two quadrature locations of hydrophones. By going through a second set of phase detectors and making use of an omnidirectional sound level as a reference in each of them, two perpendicular components of the direction of sound arrival are obtained from which the actual direction of arrival of the sound may be found quite easily. The method shown in the embodiment of FIGURE 6 is the use of quadrature deflections of a cathode ray tube beam; however, numerous other methods of displaying an angle derived from two quadrature components are known in the art and can be employed in any of the embodiments herein described. The sonobuoy system shown in FIGURES 5 and 6 therefore is capable of yielding both propagation direction and range of a sound source.

Another embodiment of a transmitting system is shown in FIGURE 7. The transmitting system of FIGURE 7 is very similar to the sonobuoy system shown in FIGURE 5. The portion of the FIGURE 7 embodiment indicated by block 42 enclosed in broken lines is the same as the system of FIGURE 5 and Hydrophones $T_1$, $T_2$, $T_4$ and $T_5$ are the same. However, it is modified by adding a Transmitting Transducer $T_6$ and the other circuitry shown in FIGURE 7 and described hereinafter. Hydrophones $T_1$, $T_2$, $T_4$ and $T_5$ are receiving transducers but Transducer $T_6$ is a transmitting transducer. Transmitting Transducer $T_6$ is located at the intersection of the lines connecting Hydrophones $T_1$, $T_5$ and $T_2$, $T_4$. The outputs of the four receiving hydrophones are fed to the same type of signal processing system as in FIGURE 5 which is represented by block 42 as explained hereinabove. A Beacon Receiver 47 receives an interrogating radar pulse from the radar on the craft which is using the sonobuoy system. The radar pulse is used to actuate Transmitter 42 which then transmits a reply pulse to the interrogating craft. This transponding action aids the interrogating craft in determining the position of the sonobuoy by the direction and distance information which is provided. The FIGURE 7 embodiment therefore incorporates a beacon function useful in locating the sonobuoy system. The addition of Transducer $T_6$ adds a sound generation function so that the sonobuoy is both a passive listening sonobuoy and an active generating system when activated by the using craft.

As shown in FIGURE 7, an Antenna 44 receives the interrogation pulse from the using craft. The pulse is fed to Detector 47 and Pulse Generator 50 which generates a pulse to actuate the Transmitting System 42, which sends out a reply pulse to the interrogating craft. Antenna 43 is used to receive a signal for actuating Transmitting Transducer $T_6$ from the using craft. The signal is detected by Detector 46, decoded by Decoder 49 and then actuates Pulse Generator 51. The output of Pulse Generator 51 actuates Oscillator 48. The output of Oscillator 48 is fed to Transducer $T_6$ which converts the electrical energy to sound energy. Amplifier 45 is used merely to raise the power level of Oscillator 48 output. Oscillator 48 has a frequency output which is within the audio range in which the sonobuoy system is intended to operate. The system therefore will listen continuously, but will transmit reply pulses for locating the sonobuoy or sound waves for purposes of receiving a reflected wave from an intruding craft only when actuated by a properly coded signal. Decoder 49 is included to make the system immune to extraneous signals picked up by antenna 43. The decoder can be any of several types available in the art and can require a particular modulation waveform or can be binary coded.

Depending upon the type of decoder used for Decoder 49, Antenna 44, Detector 47 and Keyer 50 can be eliminated. In such an instance both signals are received on Antenna 43 and Decoder 49 is required to properly route incoming signals to either Transmitter 42 or Transducer $T_6$ or both. This can be done in any of several ways and requires no detailed explanation. The routing is especially simple if binary coding is used.

The embodiment of FIGURE 7 can be easily understood from a description of the sequential operation of the entire unit. First assume that the sonobuoy is dropped in the water from an airplane or ship. Upon impact the two parts of the unit separate and the transducer portion is dropped a predetermined number of feet below the surface while the radio part remains on the surface to maintain contact with the deploying craft. The radar transponding function aids the deploying craft in locating the position of the sonobuoy relative to any craft which may use the sonobuoy. Large bar magnets can be used to cause the buoy to maintain an alignment with magnetic north. Alternatively the rotational position of the buoy relative to north can be transmitted to the deploying craft by the use of magnetometers as explained in reference to FIGURE 4. The sonobuoy is now performing as a directional listening sonobuoy and any craft equipped with receiving equipment as described relative to FIGURE 6 can use the information transmitted by the sonobuoy. Any time a ranging function is desired, the operator aboard the using craft closes a switch to transmit a signal which actuates Transducers $T_6$ to transmit a sound pulse from the sonobuoy. The sound is reflected by any submarine or ship in the area back to Hydrophones $T_1$, $T_2$, $T_4$ and $T_5$ which in turn transmits it to the using craft for use in determining the range and direction of the reflecting object. Because of the very large difference in the speed of the two propagation mediums, the transit time of the radio wave is negligible compared with the transit time of the sound wave. The range pulse may therefore be considered as if the radio receiver in the using craft were located at the sonobuoy. The time between activating the Sound Transducer $T_6$ and the reception of the reflected range pulse at the sonobuoy is an indication of the distance to the reflecting object. An A scope display similar to that used in radar may be used to display the range. The direction of the reflecting object is obtained from the information relayed by the hydrophones in the same manner as described hereinbefore with reference to FIGURES 5 and 6.

The sonobuoy systems discussed to this point yield direction information in a horizontal plane only. The hydrophones used therefore need not be completely omnidirectional since no vertical components are to be resolved by the systems. Consequently by employing hydrophones which have a pancake-shaped pattern, i.e., omidirectional in the horizontal plane but reduced sensitivity in vertical directions, undesirable effects due to surface reflections are reduced and the useful range of the system is increased. However, in some instances it may be desirable to gain knowledge of the direction in a vertical plane as well as a horizontal plane. It should be noted that the single plane system so far described can be used as vertical plane systems simply by arranging the hydrophones in a vertical plane. A transmission system which will provide both vertical and horizontal components of direction is shown in FIGURE 8. Referring to FIGURE 8, the six Hydrophones $T_7$, $T_8$, $T_9$, $T_{10}$, $T_{11}$ and $T_{12}$ are located in the center of each of the faces of an imaginary cube. The imaginary cube is considered only for purposes of spacial visualization of the location of the hydrophones. The outputs of diametrically opposed hydrophones are fed to the same synchronous switch. Hydrophones $T_7$ and $T_8$ feed Switch 53, Hydrophones $T_9$ and $T_{10}$ feed Switch 56 and Hydrophones $T_{11}$ and $T_{12}$ feed Switch 59. Hydrophones $T_9$, $T_{10}$, $T_{11}$ and $T_{12}$ are all located in the horizontal plane and when considered along with the rest of the system enclosed in dashed block 65 result in a system identical to the system of FIGURE 5 and function in the same manner to provide the two horizontal components of the received signal. Hydrophones $T_7$ and $T_8$ are located on a vertical line and therefore provide a vertical component of directional information. A third subcarrier frequency which is provided by the Frequency Tripler 52 contains the information concerning the vertical component of the direction of the received signal. This information is placed on the subcarrier as a result of the location of the Hydrophones $T_7$ and $T_8$ on a vertical line and the action of the Synchronous Switch 53 and Low Pass Filter 54. The information is recovered by making use of the reference sinusoidal subcarrier as mentioned with the previous systems. The operation of the system is the same in all other respects and therefore a mathematical description need not be given as it is merely an extension of that already presented. The positioning of the hydrophones is such that three components of a sound wave in three dimensional space are obtained. The vertical component is obtained from Hydrophones $T_7$ and $T_8$. One horizontal component is obtained from Hydrophones $T_9$ and $T_{10}$ and the other horizontal component is obtained from Hydrophones $T_{11}$ and $T_{12}$. The system of FIGURE 8 is therefore an extension of the previously described system to a third (vertical) dimension.

FIGURE 9 shows a receiving system which can be used to receive the information transmitted by the system of FIGURE 8. The portion of FIGURE 9 enclosed in dashed lines and identified by reference number 66 is identical in operation and construction to the receiving system shown in FIGURE 6; with one notable difference, Third Harmonic Filter 67 has been added. The only other additions are Frequency Tripler 68, Phase Detector 69, Integrating Filter 70, Phase Detector 71 and Low Pass Filter 72. The other elements are therefore similarly numbered to the corresponding elements of FIGURE 6.

The principles of operation of the receiver shown in FIGURE 9 are the same as those of the other receiving systems and therefore no detailed description is required.

Display of the signals can be obtained by use of the system shown in FIG. 18. The horizontal component outputs from Filters 37 and 38 of FIG. 9 are connected to Squaring Networks 160 and 161. Squaring Networks 160 and 161 are networks having an output which is equal to the square of the input. The outputs of Squaring Networks 160 and 161 are fed to Summing Network 162 where the two horizontal components are added. The output of Summing Network 162 is then fed to Network 163 which takes the square root of the input. The output of Network 163 is the horizontal component magnitude. The direction of arrival of the sound relative to horizontal is displayed by connecting the output of Filter 72 to the vertical deflection system of a cathode ray tube while the output of square root network 163 is applied to the horizontal deflection system. The direction of the horizontal component is obtained by connecting the outputs of Filters 37 and 38 to the vertical and horizontal deflection systems of a second cathode ray tube. The inputs to Networks 160 and 161 can be reversed from the way shown in FIG. 18.

Another method of display would employ a dual beam color type cathode ray tube with one beam providing the horizontal display in one color while the other provides the vertical display in another color. Any other display means can also be used as discussed at other places herein, and also means apparent to those skilled in the art. The transmitting system of FIGURE 8 can also include a Transmitting Transducer $T_6$ to provide accurate ranging information from the round trip transit time of a reflected sound wave. The addition of the decoding and receiving circuitry shown in FIGURE 7 would also be required.

Figure 10:
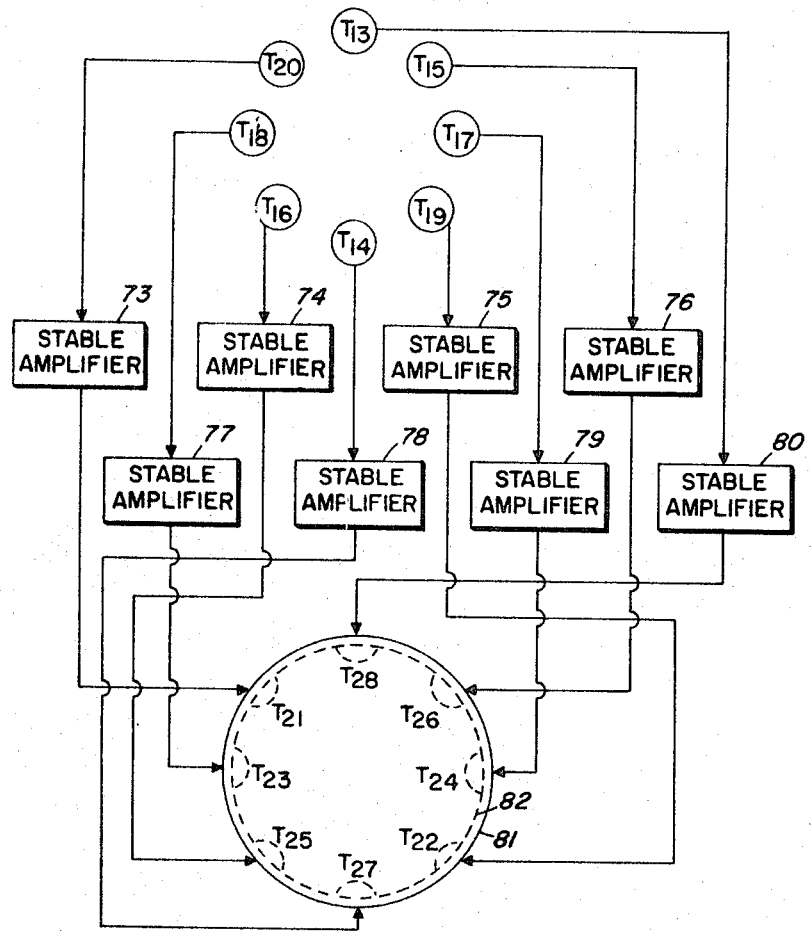
FIGURE 10 shows a direct wired system which requires no transmissions from the detecting craft or from the sonobuoy.

A system which can be used to advantage by the crew on a submarine and is closely related to the systems previously discussed is shown in FIGURE 10. The importance of the system of FIGURE 10 lies in the fact that submarines are likely to be hiding from surface ships and as a result will not wish to transmit sonar pulses; but will wish to operate in a listening mode to listen for sounds of the ship's screw or other turbulence generated by the ship's motion through the water. The system of FIGURE 10 depends upon the use of the human ears to judge both the intensity and the direction of the sound. Such a system can be of considerable importance and aid to a submarine commander in times of emergency. The diagram of FIGURE 10 shows such a system. In this system a plurality of eight receiving Hydrophones $T_{13}$ to $T_{20}$ are mounted outside of any container (not shown) equally spaced on the circumference of a circle which lies in the horizontal plane. A different number of hydrophones can be used within the scope of the invention. These hydrophones are unobstructed such that all of the amplitude and phase relations of the sound are maintained very nearly the same as they would be if the hydrophones were not there. The container diameter is chosen for properly spacing the hydrophones in accordance with the previous discussions. However, all other dimensions of the container are held to a minimum. The outputs of each of the hydrophones are amplified in Amplifiers 73 to 80 which are designed to be extremely amplitude and phase stable. The amplifiers also are narrow bandpass to reduce noise picked up by the hydrophones. The output of each amplifier goes to a corresponding Transmitting Transducer $T_{21}$ to $T_{28}$ all of which are mounted in a Cylinder 81 which is lined with sound absorbing material 82 to prevent reflections. Transducers $T_{21}$ to $T_{28}$ convert the electrical energy received from Hydrophones $T_{13}$ to $T_{20}$ into sound. The hydrophones which are diametrically opposed are connected to Transmitting Transducers which are likewise diametrically opposed; e.g., Hydrophones $T_{13}$ and $T_{14}$ respectively are connected to Transducers $T_{28}$ and $T_{27}$. The diameter of Cylinder 81 containing the Transmitting Transducers $T_{21}$ to $T_{28}$ is chosen in comparison to the diameter of the circle containing the Hydrophones $T_{13}$ to $T_{20}$ to allow for the difference in propagation velocity of water and air, that is the ratio of propagation velocities equals the ratio of the diameters. Consequently a human head placed inside Cylinder 81 containing Transmitting Transducers $T_{21}$ to $T_{28}$ will hear essentially the same thing that would be heard at the location of the receiving Hydrophones $T_{13}$ to $T_{20}$. The system requires the employment of human judgment and senses but in circumstances requiring complete silence on the part of the detecting craft the system is quite advantageous by not requiring transmission of any type.

The embodiment of FIGURE 10 requires that the Receiving Hydrophones $T_{13}$ to $T_{20}$ be mounted on the listening submarine or craft. An embodiment which does not require this limitation is shown in FIGURE 11.

Figure 11:
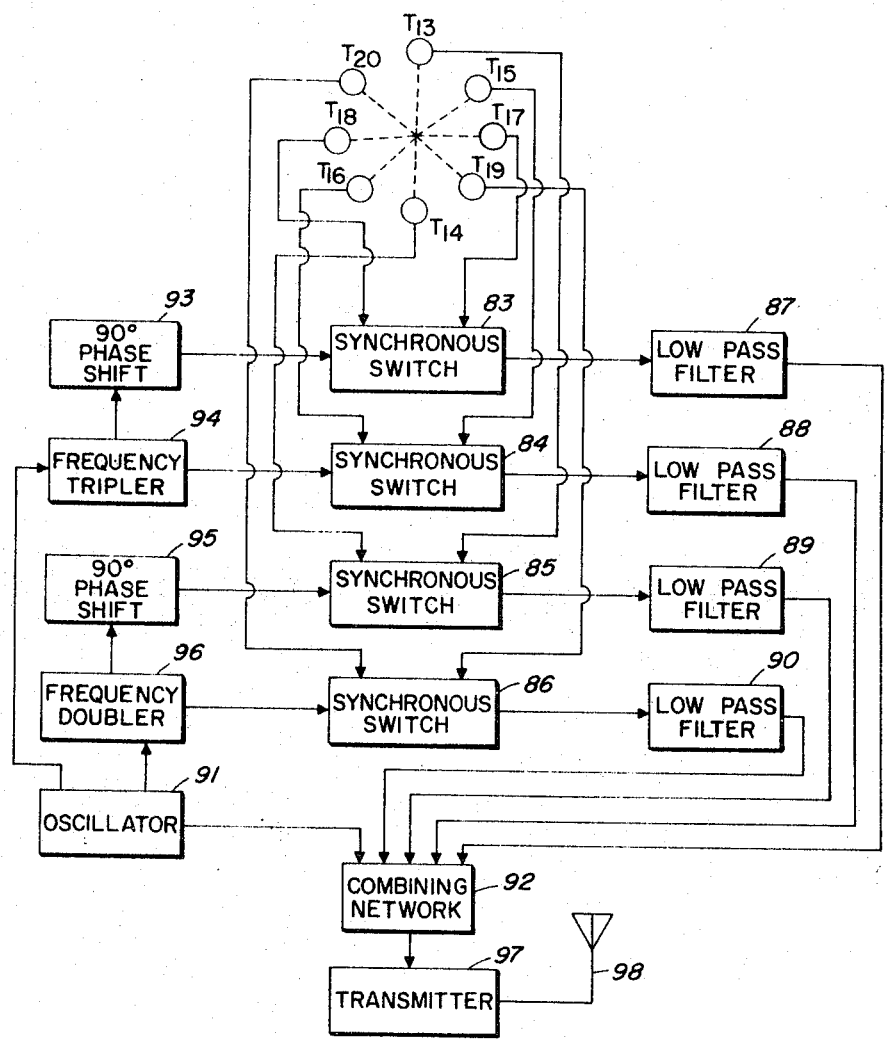
FIGURE 11 shows a transmitting system employing eight receiving hydrophones arranged around the circumference of a circle.

In FIGURE 11 the Receiving Hydrophones $T_{13}$ to $T_{20}$ are arranged in the same manner as described with reference to FIGURE 10. However, diametrically opposed Hydrophones feed Synchronous Switches 83 to 86, e.g., Hydrophones $T_{17}$ and $T_{18}$ feed Switch 83. Switches 83 to 86 respectively feed Low Pass Filters 87 to 90. The output of Oscillator 91 is fed to Combining Network 92 and to Frequency Doubler 96 and Frequency Tripler 94 which in turn respectively feed 90° Phase Shift Networks 95 and 93. Combining Network 92 also receives the outputs of Filters 87 to 90 and modulates Transmitter 97 which feeds the information to Antenna 98 for transmission to a receiving system shown in FIGURE 12. The transmission system therefore uses three subcarriers to transmit the information picked up by Hydrophones $T_{13}$ to $T_{20}$ to a receiving system. One of the three subcarriers is a reference frequency subcarrier and may be modulated with orientation information as discussed with relation to FIGURES 4 and 13.

Because diametrically opposite Hydrophones supply the inputs to each of the Synchronous Switches the output of each of these switches consist of the average value of the inputs to the two hydrophones at baseband, which corresponds to the sum value of the two channels, and a subcarrier the amplitude of which corresponds to the difference between the outputs of the two diametrically located hydrophones. Two subcarrier information channels are carried at each of two subcarrier frequencies by putting one channel on each of two quadrature phases. Since all four of the subcarrier phase and frequency relationships are derived from a single oscillator, which is transmitted as a reference subcarrier, the same relationships may be developed in the receiver for the demodulation process. The theory of operation is therefore the same as that for the previously described embodiments.

Figure 12:
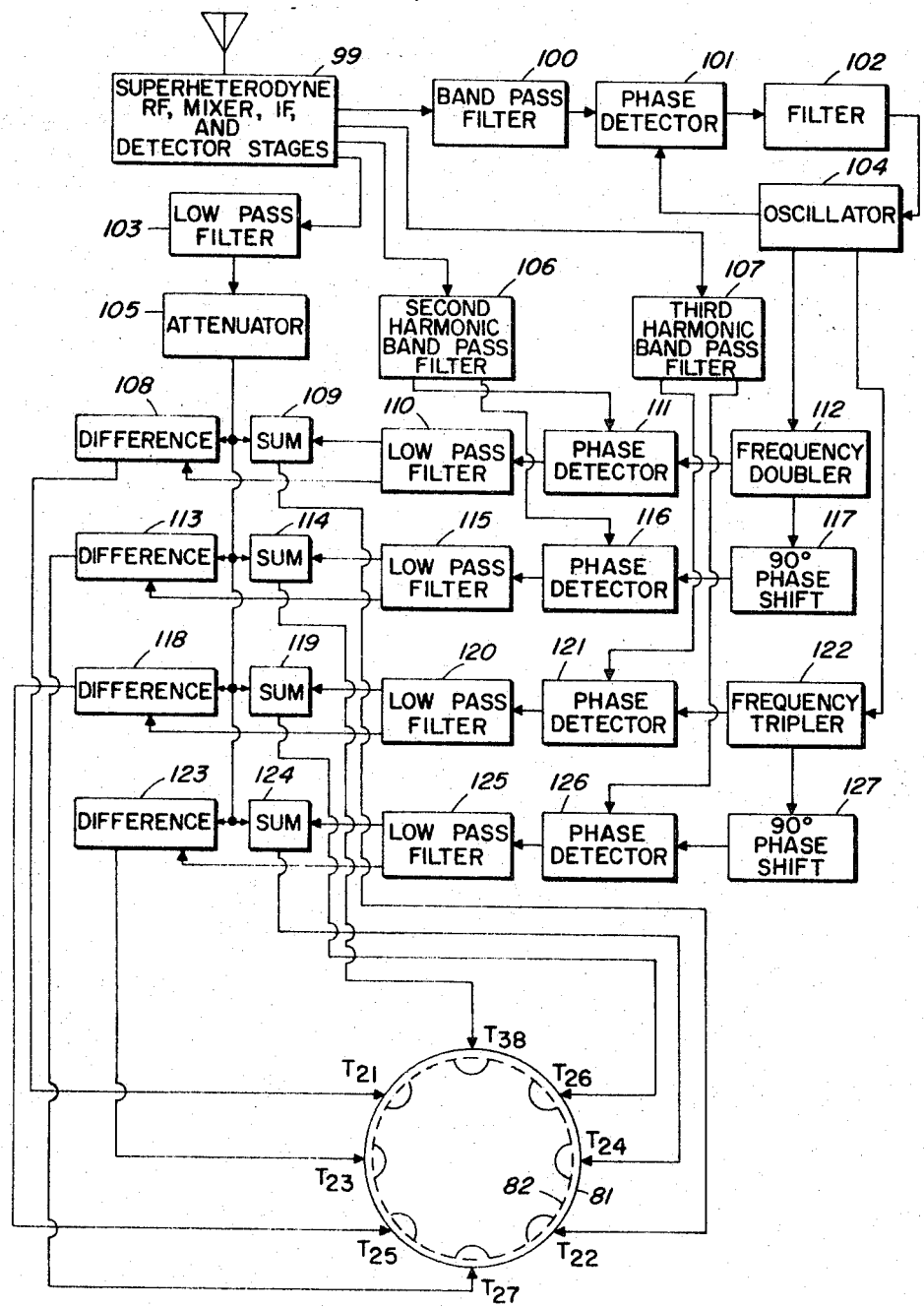
FIGURE 12 shows a receiving system capable of receiving and indicating the information transmitted by the transmitting system of FIGURE 11.

FIGURE 12 shows a block diagram of a receiving system for use with the transmitting system of FIGURE 11. In the receiving system shown in this figure the Superheterodyne Receiver 99 receives and detects the signal. Cylinder 81 contains Transducers $T_{21}$ to $T_{28}$ arranged and dimensioned the same as Cylinder 81 of FIGURE 10. However, Transducers $T_{21}$ to $T_{28}$ receive the information from Receiver 99 instead of directly from the Hydrophones $T_{13}$ to $T_{20}$. Bandpass filter 100, Phase Detector 101, Filter 102, and Oscillator 104 comprise a phase locked system to provide a noise free local reference signal as explained in reference to the receiving system of FIGURE 2. The output frequency of Oscillator 104 is doubled in Frequency Doubler 112 and tripled in Frequency Tripler 122. The outputs of each of these circuits is shifted in phase by 90 degrees in 90° Phase Shifters 117 and 127 to provide four reference phases which are equivalent to the four phases that drove the Synchronous Switches 83, 84, 85 and 86 in the transmitting system of FIGURE 11. Phase detectors 111, 116, 121 and 126 respectively receive the outputs of Doubler 112 and Second Harmonic Bandpass Filter 106; Phase Shift 117 and Second Harmonic Bandpass Filter 106; Tripler 122 and Third Harmonic Bandpass Filter 107, Phase Shift 127 and Third Harmonic Bandpass Filter 107; therefore, as explained in reference to FIGURE 6, the outputs of each of the Phase Detectors 111, 116, 121 and 126, after filtering by the Low Pass Filters 110, 115, 120 and 125 respectively, contain a voltage proportional to the difference between the outputs of two diametrically opposite positioned hydrophones. Likewise the baseband output of Low Pass Filter 103 contains the sum of all diametrically opposite positioned hydrophones. Because the diameter of the circle containing Hydrophones $T_{13}$ to $T_{20}$ is small compared to a wavelength of all sounds of interest, the sum of the signals present at any two diametrically opposite positioned hydrophones will be the same as the sum of the signals present at any other two diametrically opposite positioned hydrophones. However, the difference of said signals will be different. The Attenuator 105 is adjusted so that the sum component has an amplitude which enables it to cancel one of the difference components when the sum and difference components are added and to cancel the other difference component when they are subtracted. For example, assume that the difference between the Output Hydrophones $T_{13}$ and $T_{14}$, i.e., $(T_{13}-T_{14})$ appears at the output of Low Pass Filter 115 and their sum $(T_{13}+T_{14})$ appears at the output of Attenuator 105. Then their sum from Sum Network 114 will be $(T_{13}+T_{14})+(T_{13}-T_{14})=2T_{13}$ and their difference will be $(T_{13}+T_{14})-(T_{13}-T_{14})=2T_{14}$. Thus the outputs of two hydrophones are recovered from one of the quadrature phases of one subcarrier frequency. From both of the quadrature phases at one subcarrier frequency the outputs of four hydrophones are recovered. Consequently from two subcarrier frequencies, and a reference subcarrier, eight hydrophone outputs are obtained and can be applied to the eight transducers in the listening Cylinder 81 in the same manner as was described in the direct wired system of FIGURE 10. The characteristics of the direct wired system as described for a submarine listening system are therefore available in a remote aircraft or ship when the hydrophones are located in a sonobuoy containing the transmission system shown in FIGURE 11.

The transmitting systems described with reference to FIGURES 1, 5, 7, 8 and 11 require a means for determining the orientation of the sonobuoy in the water. One means for accomplishing this is described hereinabove with respect to FIGURE 4. Another method employs large permanent bar magnetics and likewise is described hereinbefore. A third system is shown in FIGURE 13. It should be noted that any of the several systems of determining the sonobuoy orientation can be employed in any of the transmitting systems. The only requirement is the modification of the receiving system so that it is capable of receiving the orientation information. The embodiment shown in FIGURE 13 includes Combining Network 17, and Transmitter 18 which are the same circuits shown in FIGURES 1, 4, 5, 7, 8, and 11. The elements for determining the orientation of the sonobuoy include a Reference Oscillator 128, Frequency Doubler 129, and 90° Phase Shift 130 connected in cascade and a 400 Cycle Resolver 131. Frequency Doubler 129 actuates one Stator Winding 132 of Resolver 131 while 90° Phase Shift 130 actuates the other Stator Winding 133. The Rotor 134 is attached to a permanent magnet which therefore orientates itself in a magnetic north position by the action of the earth's magnetic field. Because the excitation currents are 90° apart the phase of the output from Resolver 131 is dependent upon the position of Rotor 134 between Stator Windings 132 and 133. The position of Rotor 134 is due north, if the sonobuoy is rotated so that its reference position is also north the phase shift of the Rotor 134 is zero relative to the reference phase of Frequency Doubler 129.

Rotation of the Sonobuoy 134 from the reference position consequently shifts the phase of the output of Rotor 134 relative to the reference phase of Frequency Doubler 129 and thus is indicative of the angular displacement of the Sonobuoy and Windings 132 and 133 relative to the Rotor 134 which is always oriented to the north by the magnet. The output of Resolver 131 is fed to Modulator 136 through Combining Network 135, where it is combined with the output of Oscillator 128 and their sum modulates the output of Oscillator 16 (shown in FIGURES 1 et al.) with the orientation information for transmission to the receiving system.

Figure 14:
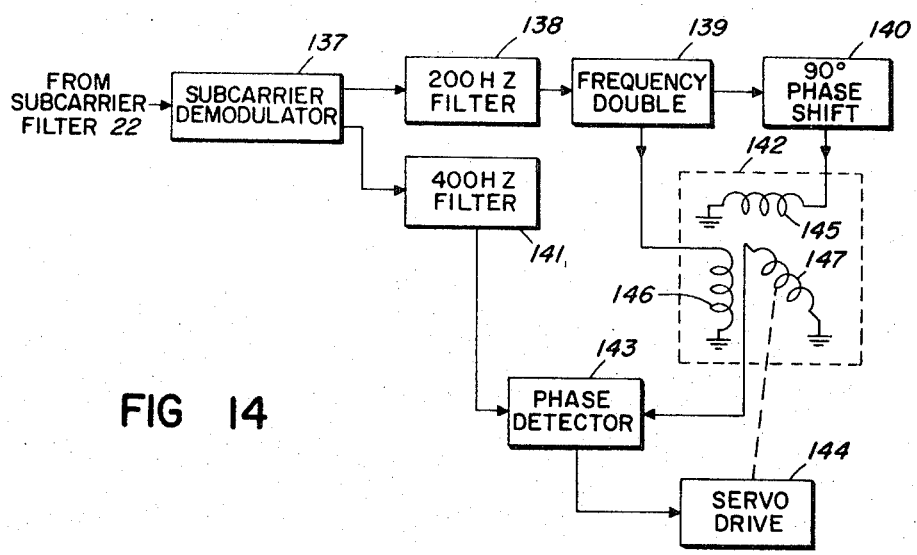
FIGURE 14 shows the modifications required of any of the various receiving embodiments in order to receive and indicate the orientation information transmitted by the orientation system of FIGURE 13.

Receiving system modifications compatible with the system of FIGURE 13 are shown in FIGURE 14. The modifications consist of the addition of Subcarrier Demodulator 137, 200 Hertz Filter 138, Frequency Doubler 139 and 90° Phase Shift Network 140 connected in cascade. The 400 Hertz component contained in the received signal is received by Phase Detector 143 from Filter 141. Frequency Doubler 139 and 90° Phase Shift 140, respectively, feed Stator Windings 146 and 145 of 400 Cycle Resolver 142. Since the signals to these two Stator Windings differ 90° in phase, the phase of the signal in the Rotor 134 is dependent upon the position of the Rotor. The output of Rotor 147 is fed to Phase Detector 143 which compares the phase relationship of its two inputs. The output of Phase Detector 143 is an error signal which controls a Servo Drive Motor 144 which drives the Rotor 147 to a null position where there is no output from Phase Detector 143. The output of the Phase Detector always has the correct polarity to cause the Servo Motor 144 to drive the Rotor 147 to the correct position corresponding to the position of the Rotor 134 at the Transmitter. Thus the position of Rotor 147 indicates the orientation of the sonobuoy relative to north.

Since the subcarrier output generated by the system of FIGURE 4 is essentially the same as the subcarrier output of the system of FIGURE 13, the receiving system of FIGURE 14 may be used with either of these transmitting systems.

It should be pointed out that since the shaft position of the Rotor 147 of Resolver 142 is a direct rotational indication of the rotational position of the sonobuoy relative to north, this shaft may be directly coupled to the deflection system of the display cathode ray tube causing the deflection system to rotate to correct for the rotational position of the sonobuoy so that north may always be displayed at the top of the cathode ray tube regardless of the rotational position of the deployed sonobuoy. This adds significantly to the operational utility of the directional sonobuoy system.

Another receiving system for the orientation transmission systems of FIGURES 4 and 13 is shown in FIGURE 17. In this system the orientation of the sonobuoy relative to north is displayed on a cathode ray tube or other display device and the operator can compare the display of the direction of the arrival of the sound relative to the sonobuoy on one cathode ray tube with the direction of the sonobuoy relative to north on another cathode ray tube to determine the direction of arrival of the sound relative to north. For convenience both may be displayed on a single dual color display tube. Athough this system may not be as convenient as the system described above which couples the display system to the sonobuoy orientation signal such that north is always at the top of the screen, it may be desirable under some circumstances because of its relative simplicity. The system of FIGURE 17 is similar to that of FIGURE 14 and corresponding elements are similarly numbered. However, the Resolver 142, Phase Detector 143 and Servo Drive 144 which indicate the rotational position of the sonobuoy relative to north by the rotational position of a Rotar 147 position are replaced by Phase Detectors 156 and 157 and Filters 158 and 159. The output of one of the filters gives the east west component of the rotational position while the output of the other gives the north south component of rotational position so that when they are applied to the deflection system of a cathode ray tube, the direction of deflection relative to the top of the screen will indicate the position of the sonobuoy relative to north.

An orientation system using a movable compass is shown in FIGURE 15. In the FIGURE 15 embodiment the forces produced on a Permanent Magnet 148 by the earth's magnetic field are used to position the Pointer 150 of a Potentiometer 149. The output voltage from Potentiometer 149 is used to control the frequency of the Voltage Controlled Oscillator 151. The output of Oscillator 151 is fed to Modulator 152 where it is used to modulate the reference subcarrier from Oscillator 16 (shown in FIGURE 1) before it is combined with the other subcarriers in the Combining Network 17, the output of which is then applied to Transmitter 19 for transmission to the instrumented deploying craft. The frequency of Oscillator 151 can be established such that a due north position of the sonobuoy gives a reference frequency. Changes in this frequency because of the control voltage from Potentiometer 149 are then indicative of the orientation of the sonobuoy. The calibration can be any convenient system chosen, but is somewhat dependent upon the voltage of the battery which energizes Potentiometer 149 and the sensitivity of Oscillator 151. Combining Network 17 and Transmitter 18 are the same as those shown in the previously described transmission system. The other circuits are therefore additions required to transmit the orientation information.

The receiving system useful with the Transmitting System of FIGURE 15 is shown in FIGURE 16. The receiving system will be the same as any of those shown in FIGURES 2 and 6, for example, depending upon which transmission system is used, but will be modified by the addition of Demodulator 153, Frequency Discriminator 154, and Indicator 155. The output of Filter 22 of the receiver system contains the orientation information and is fed to Frequency Discriminator 154 by Demodulator 153. The output of Discriminator 154 is a voltage indicative of the frequency of Oscillator 151 of the transmitting system, and therefore is indicative of the orientation of the sonobuoy.

The indicator 155 receiving the Discriminator 154 output can be any of several types of indicators available in the art and can give an audio or a visual indication.

The receiving systems described are shown to employ cathode ray beams as a means of displaying the direction and ranging information received from the hydrophones. Other means can be used within the scope of the invention. A very satisfactory means which also supplies a permanent record is a two channel tape recorder. The electrical impulses present at the outputs of Low Pass Filters 37 and 38 are directed to the recording head of a tape recorder and applied to the tape. The signals are then permanently recorded for usage at any time desired. This system gives the operator more time to utilize the information and provides time for accurate computation. The recorded information can be used to actuate the deflection plates of an oscilloscope in the same manner as if the signals are directly applied to the scope without employing the recording. It is therefore possible to gain the advantages of permanently recording the information and simultaneously interpreting the information by its reaction on an oscilloscope. A more complete recording of the information for use at a future date may be obtained by recording the entire demodulated output of receiver 21. Then at any future time this recording could be played through all of the remainder of the system recovering all information transmitted by the sonobuoy.

Although this invention has been described with respect to particular embodiments thereof, it is not to be so limited, as changes and modifications may be made therein which are within the spirit and scope of the invention.

I claim:

1. A direction finding sound detecting system including a transmitting section and a remotely located receiving section: said transmitting section comprising; a plurality of sound sensitive receiving transducers lying in a plane and arranged in diametrically opposed pairs, a plurality of subcarrier channels, said plurality of subcarrier channels being equal to the number of pairs of transducers, each of said subcarrier channels having signal processing means as an input means, a first reference frequency oscillator for actuating each of said signal processing means, each of said subcarrier channels having signal detection means, one pair of said transducers actuating one of said signal detection means, signal combining means receiving the outputs of said subcarrier channels and said reference oscillator and means for transmitting the output of said signal combining means to said receiving section, said receiving section comprising; means for receiving the signal transmitted by said transmitting section, a second reference frequency oscillator actuated by the output of said means for receiving, the nominal frequency of said second reference oscillator being equal to the nominal frequency of said first reference oscillator; a plurality of receiver channels equal in number to the plurality of subcarrier channels in said transmitting section; signal processing means serving as an input to each of said receiver channels, the functions of the signal processing means contained in said receiving section being similar to the functions of the signal processing means contained in said transmitting section so that each of said receiver channels has an output signal indicative of the signals received from a pair of said transducers, and indication means receiving the outputs of said receiver channels.

2. The system of claim 1 wherein said receiving transducers are omnidirectional hydrophones and said signal detection means are synchronous switches.

3. The system of claim 2 wherein said plurality of subcarrier channels comprises two separate channels and said diametrically opposed pairs of hydrophones are arranged in a perpendicular relationship so that said hydrophones are located at the corners of a square.

4. The system of claim 1 wherein said plurality of subcarrier channels comprises two separate channels and said diametrically opposed pairs of transducers are arranged in a perpendicular relationship so that said transducers are located at the corners of a square.

5. The system of claim 4 wherein said signal processing means for one of said subcarrier channels is a means for increasing the frequency of said first reference oscillator by a first integer and said signal processing means for the other of said subcarrier channels is a means for increasing the frequency of said first reference oscillator by a second integer.

6. The system of claim 4 wherein said signal processing means for one of said subcarrier channels is a frequency multiplier and said signal processing means for the other subcarrier channel is a phase shift network.

7. The system of claim 5 wherein said first integer is two and said second integer is three.

8. The system of claim 1 including means for determining the orientation of said transmitting section with respect to a predetermined reference position and means for feeding the output of said means for determining orientation to said signal combining means.

9. The system of claim 8 wherein said means for determining orientation comprises at least two magnetometers arranged in a mutually perpendicular relationship.

10. The system of claim 8 wherein said means for determining orientation comprises a resolver.

11. The system of claim 8 wherein said means for determining orientation comprises a potentiometer having a rotatable arm, and voltage sensitive means for receiving the output from said potentiometer.

12. The system of claim 4 including a transmitting transducer located at the intersection of the diagonals of said square and actuation signal reception means for actuating said transmitting transducer upon reception of an actuation signal.

13. The system of claim 12 including means for receiving an interrogation signal, and means for transmitting a location signal upon reception of a command signal.

14. The system of claim 13 wherein said command signal and said interrogation signal are received by a common reception means which includes a decoding circuit for properly routing said command signal and said interrogation signal.

15. The system of claim 4 further including a third subcarrier channel, a third pair of sound sensitive transducers, said third pair lying in a plane perpendicular to the plane containing said first two pairs of sound sensitive transducers.

16. The system of claim 15 wherein one of said signal processing means is a first multiplier for multiplying said first reference frequency by a first integer, a second of said signal processing means is a second multiplier for multiplying said first reference frequency by a second integer and the third signal processing means is a phase shift network.

17. The system of claim 16 wherein said first integer is two and said second integer is three.

18. The system of claim 1 wherein said plurality of subcarrier channels comprises four channels and said diametrically opposed pairs of transducers are equally spaced around the circumference of a circle.

19. The system of claim 18 wherein said transducers are omnidirectional hydrophones, said signal processing means for the first of said subcarrier channels is a means for multiplying said reference frequency by a first integer, said signal processing means for the second of said subcarrier channels is a means for multiplying said reference frequency by a second integer, and said signal processing means for the third and fourth subcarrier channels are first and second phase shift networks.

20. The system of claim 1 wherein the spacing between the transducers of each pair is less than the wavelength of the frequency of sound to be detected.

21. The system of claim 5 wherein the spacing between the transducers of each pair is less than the wavelength of the frequency of sound to be detected.

22. The system of claim 6 wherein the spacing between the transducers of each pair is less than the wavelength of the frequency of sound to be detected.

23. The system of claim 7 wherein the spacing between the transducers of each pair is less than the wavelength of the frequency of sound to be detected.

References Cited
UNITED STATES PATENTS

| | | | |
|---|---|---|---|
| 2,898,589 | 8/1959 | Abbott | 340—6 X |
| 3,022,462 | 2/1962 | Keiper. | 340—2 X |
| 3,148,351 | 9/1964 | Bartlett | 340—6 X |
| 3,239,799 | 3/1966 | Boucheron | 340—6 |

RICHARD A. FARLEY, Primary Examiner

U.S. Cl. X.R.

340—3, 6

UNITED STATES PATENT OFFICE
CERTIFICATE OF CORRECTION

Patent No. 3,461,421                            August 12, 1969

Harris A. Stover

It is certified that error appears in the above identified patent and that said Letters Patent are hereby corrected as shown below:

Column 4, line 31, "fore" should read -- more --. Column 6, lines 51 to 53, the equation should appear as shown below:

$$T_C = A \sin w(t + \frac{D \cos \theta}{2V}) \quad (3)$$

Signed and sealed this 21st day of April 1970.

(SEAL)
Attest:

Edward M. Fletcher, Jr.                      WILLIAM E. SCHUYLER, JR.
Attesting Officer                                Commissioner of Patents